United States Patent Office 2,945,784
Patented July 19, 1960

2,945,784

STREPTOMYCIN AND DIHYDROSTREPTOMYCIN SALTS

Gustavo A. Weitnauer, Torre Annunziata, Naples, Italy, assignor to Lepetit S.p.A., Milan, Italy No Drawing. Filed Mar. 25, 1957, Ser. No. 647,963

Claims priority, application Italy Mar. 29, 1956

8 Claims. (Cl. 167—65)

The present invention relates to new complex salts of streptomycin and dihydrostreptomycin, and to their preparation. More particularly the invention is concerned with streptomycin glucoheptonate complex and dihydrostreptomycin glucoheptonate complex.

Streptomycin glucoheptonate complex and dihydrostreptomycin glucoheptonate complex are the crystalline calcium glucoheptonate complexes of streptomycin and dihydrostreptomycin. It is known that streptomycin and dihydrostreptomycin, when administered for rather prolonged periods and in comparatively high doses, cause neurotoxic phenomena which limit their therapeutical usefulness. It is therefore of great utility to find compositions which allow increase of the dose and prolongation of the administration of the two drugs.

It is one object of the present invention to provide new and therapeutically useful streptomycin and dihydrostreptomycin complex salts having low chronic toxicity. It is another object of the invention to describe methods useful for the preparation of said complex salts. Further objects of the invention will become apparent throughout the disclosure.

It has been discovered that on reacting streptomycin or dihydrostreptomycin sulfate with an equivalent amount of calcium glucoheptonate in water no calcium sulfate precipitates, as would be expected in view of the scanty solubility of said inorganic salt. On the contrary, a water soluble complex salt forms, which may be recovered from the water solution by addition of a water miscible organic solvent, for example methanol or acetone.

It is hereby intended that the term "glucoheptonate" used throughout the present specification relates particularly to complex salts of the mixture commonly defined as glucoheptonic acid consisting of D-gluco-D-glucoheptonic acid, or α-D-glucoheptonic acid, and of minor amounts of D-gluco-D-ido-heptonic acid, or β-D-glucoheptonic acid. This mixture is commercially produced starting from D-glucose through its cyanohydrin. However, similar complex salts are obtained also with all known glucoheptonic acids.

For practical purposes, the complex salts with which the present invention is concerned may be prepared by one of the following processes or by a combination thereof.

A water solution of streptomycin or dihydrostreptomycin sulfate and a water solution of an equivalent amount of calcium glucoheptonate are prepared independently. The solutions are then mixed and the resulting solution is concentrated in vacuo to an approximate concentration of one mole of the complex in 6-8 liters of water, taking care not to exceed the temperature of 40° C. Into the concentrated complex salt solution 4 to 6 volumes of a water soluble organic solvent, such as a lower aliphatic alcohol, dioxane or acetone or a mixture thereof are quickly added. The product precipitates and is collected by suction and dried in vacuo.

Alternatively, a concentrated solution of calcium glucoheptonate is prepared, and an equivalent amount of streptomycin or dihydrostreptomycin sulfate is added. The amount of water is so determined that a solution of one mole of complex in 6-8 liters of water results. The complex is thereafter precipitated as indicated above.

By another modification of the process, into a thick water suspension of calcium hydroxide a water solution of glucoheptonic acid is quickly added to substantially neutral pH (about 5 to 7). To the obtained solution an equivalent amount of streptomycin or dihydrostreptomycin in the form of the sulfate is added.

Also in this case the water amount is calculated so as to reach a final concentration of one mole of complex in 6-8 liters of water. The precipitation is carried out as above.

Streptomycin glucoheptonate complex prepared according to any of the above procedures is a white crystalline powder. It has the empirical formula $$C_{84}H_{162}Ca_3N_{14}O_{84}S_3$$

with molecular weight 2928.76. The theoretical streptomycin content is about 397 mcg./mg. The pH of a water solution of the complex containing 200,000 mcg./ml. of streptomycin is 5.95±0.1. The complex is very soluble in water, nearly insoluble in lower aliphatic alcohols, acetone and dioxane.

Dihydrostreptomycin glucoheptonate complex is also a white crystalline powder. It has the empirical formula $C_{84}H_{166}Ca_3N_{14}O_{84}S_3$, with molecular weight 2932.77. The theoretical dihydrostreptomycin content is about 398 mcg./mg. The pH of a water solution of the complex containing 200,000 mcg./ml. of dihydrostreptomycin is 6.0±0.1. The complex is very soluble in water, nearly insoluble in lower aliphatic alcohols, acetone and dioxane.

The water solutions of the new complexes do not become brown-reddish with aging, thus differing from the water solutions of streptomycin or dihydrostreptomycin sulfate or hydrochloride.

The new complexes show an extremely low chronic toxicity. Chronic toxicity of streptomycin and dihydrostreptomycin is characterized by severe damage of the eighth cranial nerve, with impairment of equilibrium and with deafness.

The low toxicity of streptomycin and dihydrostreptomycin glucoheptonate complex was ascertained by the goldfish method described by Ballard et al. in J. Amer. Pharm. Assoc. 45, 181 (1956).

Four groups of 10 goldfish were exposed to streptomycin sulfate, dihydrostreptomycin sulfate, streptomycin glucoheptonate complex and dihydrostreptomycin glucoheptonate complex; a fifth group of 10 goldfish was used as the control.

The following tables give the results obtained with concentrations of 200, 500, 1000 and 2000 mg./l. of the four substances in deionized water. The readings were made after 10 days except when otherwise indicated.

|   | Concentr., mg./l | galvanotr. response [1] | fin droop, percent | | mortal- ity, percent |
|---|---|---|---|---|---|
|   |   |   | dorsal | caudal |   |
| Control | 0 | 1 | 0 | 0 | 0 |
| Streptomycin sulfate | 200 | 1.5 | 100 | 50 | 30 |
|  | 500 | 2.5 | 100 | 100 | 70 |
| Dihydrostreptomycin sulfate | 500 | 2.8 | 90 | 50 | 0 |
|  | 1,000 | 2.8 | 100 | 100 | 10 |
| Streptomycin glucoheptonate complex | 200 | 1.05 | 10 | 10 | 0 |
|  | 500 | 1.2 | 40 | 10 | 0 |
|  | 1,000 | 1.2 | 50 | 10 | 0 |
| Dihydrostreptomycin glucoheptonate complex | 500 | 0.9 | 10 | 0 | 0 |
|  | 1,000 | 1.00 | 10 | 0 | 0 |
|  | 2,000 | 1.2 | 40 | 0 | 0 |

[1] The values are given as the ratio between the reading at the 7th day and the initial reading taken as 1.

The results, however, are still more striking when the experiments are carried out for fifty days and more. The following table is representative of the results obtained after fifty days.

|   | Concentr., mg./l | galvanotr. response | fin droop, percent | | mortal- ity, percent |
|---|---|---|---|---|---|
|   |   |   | dorsal | caudal |   |
| Control | 0 | 1.0 | 0 | 0 | 0 |
| Streptomycin sulfate | 500 | 6.0 | 100 | 100 | 100 |
| Dihydrostreptomycin sulfate | 500 | 5.0 | 100 | 100 | 40 |
|  | 1,000 | 6.0 | 100 | 100 | 90 |
| Streptomycin glucoheptonate complex | 500 | 1.0 | 10 | 0 | 0 |
|  | 1,000 | 1.2 | 20 | 0 | 10 |
| Dihydrostreptomycin glucoheptonate complex | 500 | 1.0 | 10 | 0 | 0 |
|  | 1,000 | 1.0 | 10 | 0 | 0 |
|  | 2,000 | 1.1 | 0 | 0 | 0 |

The considerably low chronic toxicity of the new complexes was also tested on frogs dipped in solutions containing variable concentrations of streptomycin sulfate, dihydrostreptomycin sulfate, streptomycin glucoheptonate complex and dihydrostreptomycin glucoheptonate complex. The percentages of mortality are summarized in the following table, which is drawn to a comparison between streptomycin sulfate and streptomycin glucoheptonate complex.

| Substance | concentr., mg./l. | mortality rate after x days | | | | | | | | | |
|---|---|---|---|---|---|---|---|---|---|---|---|
|   |   | 5 | 10 | 15 | 20 | 25 | 30 | 35 | 40 | 45 | 50 |
| Streptomycin sulfate | 50 | 0 | 50 | 75 |  | 100 |  |  |  |  |  |
|  | 100 | 0 | 75 | 100 |  |  |  |  |  |  |  |
|  | 200 | 0 | 100 |  |  |  |  |  |  |  |  |
| Streptomycin glucoheptonate complex | 1,000 | 0 | 0 | 0 | 0 | 0 | 25 | 50 | 75 |  | 100 |
|  | 1,500 | 0 | 0 | 0 | 0 | 25 | 50 | 75 |  |  | 100 |

This considerable decrease in toxicity is not limited to chronic toxicity, but extends to acute toxicity, when tested in mice by intravenous or subcutaneous route. The following table gives comparative acute toxicity data of the complexes with those of streptomycin and dihydrostreptomycin sulfate in comparable conditions.

| Substance | $LD_{50}$ in mice on administration of 0.5 ml. of water solution [1] | |
|---|---|---|
|   | intravenously | subcutaneously |
| Streptomycin sulfate | 90–110 | 600–700 |
| Dihydrostreptomycin sulfate | 120–140 | 1,100–1,300 |
| Streptomycin glucoheptonate complex | 180–200 | 1,400–1,500 |
| Dihydrostreptomycin glucoheptonate complex | 240–260 | 1,800–1,900 |

[1] The values are given in mg. streptomycin or dihydrostreptomycin free base per kg. of animal.

The new complex salts afford a useful way of simultaneous administration of streptomycin or dihydrostreptomycin and calcium ions. This simultaneous administration cannot be achieved, for instance, by preparing a solution containing the most commonly used streptomycin or dihydrostreptomycin inorganic salt, i.e. the sulfate, along with a water soluble calcium salt, such as chloride, because calcium sulfate would immediately precipitate.

Of course for therapeutical purposes dry mixtures may be prepared containing suitable amounts of streptomycin or dihydrostreptomycin sulfate and glucoheptonate, to be dissolved in water before use. In this case a fresh solution of the complex is provided, which in no way differs from a solution as obtained by dissolving in water a complex prepared according to any of the above procedures.

The new streptomycin and dihydrostreptomycin glucoheptonate complexes may be administered alone or in mixture with other known streptomycin or dihydrostreptomycin salts, such as the sulfate, pantothenate, p-aminosalicylate and/or the salt with pyruvic acid isonicotinylhydrazone. In any case both the chronic and acute toxicity of those known salts is considerably decreased. They may also be mixed with other water soluble calcium salts, such as calcium disodium ethylenediaminetetraacetate, or with other antibiotics, such as f.i. penicillin salts, or with other pharmacologically useful substances. To their pharmaceutical compositions thickening agents, stabilizing, wetting and buffering agents may also be added.

Owing to their decreased chronic toxicity, as above stated, the new complex salts may be used in daily dosage markedly greater than those commonly used for streptomycin or dihydrostreptomycin salts. Thus, daily doses up to 5 g., corresponding to about 2 g. of streptomycin or dihydrostreptomycin free base may be safely administered intramuscularly to humans without observing the common untoward reactions usually accompanying the administration of the two antibiotics. The complex salts are safe also for intrathecal use, whereby doses up to 20 mg. daily dissolved in saline solution may be used. The intrapleural administration has also been found very useful, and doses up to 3–4 g. daily dissolved in saline solution have proven devoid of neurotoxicity.

Solutions of 200–300 mg. in 1–2 ml. of saline solution were also used as aerosols.

The following examples are illustrative of the invention, although they are not intended as exclusive embodiment of the invention.

Example 1

A solution of 145.75 g. streptomycin sulfate in 1000 ml. water and a solution of 147.13 g. calcium glucoheptonate in 1000 ml. water are mixed and the resulting, slightly opalescent solution is sterilized by filtration through a Seitz filter and evaporated in vacuo on a steam bath to a volume of 700 ml. caring that the temperature does not exceed 40° C. The mixture is cooled to room temperature, then 3500 ml. sterilized methanol are rapidly added, causing precipitation of white crystals. The mixture is stirred for 30 minutes, then the precipitate is collected by suction, washed with cold sterilized methanol and dried in vacuo at 40° C. to constant weight. Yield 280 g. (95.5%) of streptomycin glucoheptonate complex.

The product assays 376 mcg./mg. of streptomycin, corresponding to 94.7% of the theoretical potency. On this basis the yield is 90.5%.

Example 2

A solution is prepared from 147.13 g. calcium glucoheptonate in 700 ml. water, then 145.95 dihydrostreptomycin sulfate are added at portions under stirring. The resulting clear solution is sterilized by a Seitz filter, then four liters sterilized dioxane are quickly added, whereby a white precipitate forms. The mixture is stirred for 30 minutes then the precipitate is collected by suction, washed with dioxane and dried in vacuo at 40° C. to constant weight. Yield 284 g. (97%) of dihydrostreptomycin glucoheptonate complex.

The product assays 382 mcg./mg. of dihydrostreptomycin, corresponding to 96% of the theoretical potency. On this basis the yield in 93%.

Example 3

To a suspension of 22.2 g. calcium hydroxide in 50 ml. water a solution of 135.6 g. glucoheptonic acid in 750 ml. water is quickly added under stirring; the end pH of the resulting clear solution is about 7.5. To the solution 145.75 g. of streptomycin sulfate are added at portions. The resulting solution is sterilized through a Seitz filter and diluted with 3500 ml. acetone, whereby a heavy white precipitate forms. The mixture is stirred for 30 minutes, then the precipitate is collected by suction and dried in vacuo at 40° C. Yield 275 g. (93.7%) of streptomycin glucoheptonate complex.

The product assays 385 mcg./mg. of streptomycin, corresponding to 97% of the theoretical potency. On this basis the yield is 90.8%.

Example 4

One flask provided with rubber cap is filled under aseptic conditions with 2 g. dihydrostreptomycin glucoheptonate complex and carefully stoppered. This preparation is ready to be used extemporaneously for intramuscular injection after addition of 5 ml. sterile distilled water.

Example 5

One flask provided with rubber cap is filled under aseptic conditions with 2 g. streptomycin glucoheptonate complex and carefully stoppered. This preparation is ready to be injected intramuscularly after addition of 5 ml. sterile distilled water. Both this preparation and that of Example 4 may also be diluted with saline solution and used in appropriate doses and concentrations intrathecally, intrapleurally or as aerosols.

Example 6

One flask provided with rubber cap is filled under aseptic conditions with 1 g. streptomycin glucoheptonate complex and 2 g. streptomycin sulfate and carefully stoppered. This preparation is ready to be injected intramuscularly after addition of 5 ml. sterile distilled water.

Example 7

One flask provided with rubber cap is filled under aseptic conditions with 2 g. dihydrostreptomycin glucoheptonate complex and 1 g. dihydrostreptomycin p-aminosalicylate and carefully stoppered. This preparation is ready to be diluted with 5 ml. sterile distilled water and injected intramuscularly or intravenously.

Example 8

One flask provided with rubber cap is filled under aseptic conditions with 1 g. streptomycin sulfate and an equivalent amount of calcium glucoheptonate and carefully stoppered. This preparation, when dissolved in 5 ml. sterile distilled water, provides a solution ready for parenteral use.

I claim:

1. The crystalline calcium glucoheptonate complex of the formula:

$$(Str)_2 \cdot (H_2SO_4)_3 \cdot [Ca(C_7H_{13}O_8)_2]_3$$

wherein Str is a member of the class consisting of streptomycin and dihydrostreptomycin.

2. The crystalline streptomycin calcium glucoheptonate complex of the formula:

$$(C_{21}H_{39}N_7O_{12})_2 \cdot (H_2SO_4)_3 \cdot [Ca(C_7H_{13}O_8)_2]_3$$

3. The crystalline dihydrostreptomycin calcium glucoheptonate complex of the formula:

$$(C_{21}H_{41}N_7O_{12})_2 \cdot (H_2SO_4)_3 \cdot [Ca(C_7H_{13}O_8)_2]_3$$

4. A pharmaceutical composition in dosage unit form, and composed of 1 to 5 grams of the crystalline complex salt of calcium glucoheptonate with the sulfate of an antibiotic of the class consisting of streptomycin and dihydrostreptomycin, together with a pharmaceutical carrier.

5. A pharmaceutical composition in dosage unit form, which comprises from 10 to 95% of the crystalline complex salt of calcium glucoheptonate with the sulfate of an antibiotic of the class consisting of streptomycin and dihydrostreptomycin, and from 90 to 5% of a compound of the class consisting of streptomycin and dihydrostreptomycin organic and inorganic salts.

6. A pharmaceutical composition as described in claim 5, wherein the compound is the pantothenate salt.

7. A pharmaceutical composition as described in claim 5, wherein the compound is the p-aminosalicylate salt.

8. A pharmaceutical composition as described in claim 5, wherein the compound is the salt with pyruvic acid isonicotinylhydrazone.

References Cited in the file of this patent

UNITED STATES PATENTS

| | | |
|---|---|---|
| 2,583,534 | Mast | Jan. 29, 1952 |
| 2,751,324 | English | June 19, 1956 |

OTHER REFERENCES

Am. Jr. Pharm., February 1950, pp. 67–74.

Geraci et al.: Proc. Staff Meetings Mayo Clinic, 29: 19, pp. 536–539, Sept. 5, 1954.